(12) United States Patent
Zirwas

(10) Patent No.: US 6,577,612 B1
(45) Date of Patent: Jun. 10, 2003

(54) TRANSMISSION SYSTEM FOR TRANSMITTING DIGITAL SIGNALS ON A RADIO SUBSCRIBER LINE NETWORK

(75) Inventor: Wolfgang Zirwas, Groebenzell (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/200,112

(22) Filed: Nov. 25, 1998

(30) Foreign Application Priority Data

Nov. 25, 1997 (DE) .......................................... 197 52 197

(51) Int. Cl.⁷ .............................. H04B 7/212; H04J 3/00
(52) U.S. Cl. ...................................................... 370/336
(58) Field of Search ................................. 370/319, 321, 370/329–330, 336, 337, 347; 455/422, 450, 522, 451, 452; 375/295, 298

(56) References Cited

U.S. PATENT DOCUMENTS

| | | | |
|---|---|---|---|
| 4,972,506 A | | 11/1990 | Uddenfeldt ................ 370/337 |
| 5,210,771 A | * | 5/1993 | Schaeffer et al. ............ 370/330 |
| 5,533,027 A | * | 7/1996 | Akerberg et al. ............ 370/280 |
| 5,579,306 A | * | 11/1996 | Dent .......................... 370/330 |
| 5,822,310 A | * | 10/1998 | Chennakeshu et al. ..... 370/317 |
| 6,044,486 A | * | 3/2000 | Underseth et al. .......... 714/760 |

FOREIGN PATENT DOCUMENTS

| | | |
|---|---|---|
| EP | 0 845 916 | 6/1998 |
| WO | WO 98/27380 | 12/1995 |

OTHER PUBLICATIONS

Sunil K. Vagdama, Adaptive Bit Rate Trnasmission for Personal Communications, Jun. 26, 1999, pp. 1–9.

* cited by examiner

*Primary Examiner*—Kwang Bin Yao
*Assistant Examiner*—Kevin C. Harper
(74) *Attorney, Agent, or Firm*—Schiff Hardin & Waite

(57) ABSTRACT

In a radio subscriber line network, the overall transmission power of the base station for the digital signal transmission from the base station to the radio subscribers is divided onto a number of radio channels having a differing bit number per symbol, the digital signals intended for radio subscribers located at a greater or smaller distance from the base station are transmitted with correspondingly higher or lower bit number per symbol, whereby the multiply transmitted bits are respectively recombined to a single bit at the reception side.

2 Claims, 2 Drawing Sheets

TRANSMISSION SYSTEM FOR TRANSMITTING DIGITAL SIGNALS ON A RADIO SUBSCRIBER LINE NETWORK

BACKGROUND OF THE INVENTION

1. Field of the Invention

The present invention is directed to a system for transmitting digital signals in a radio subscriber line network and more particularly to a system for transmitting digital signals in a broadband RLL (radio in the local loop) subscriber line network.

2. Description of the Prior Art

A radio subscriber line network is a system of radio cells that respectively contain a stationary base station around which the networks terminations (NT's) of the radio subscribers are located in a radius of, for example, 1 km. A system is typically area-covering wherein the base station is usually placed as centrally in the cell as possible and the network terminations are more or less uniformly distributed in the radius. FIG. 1 shows such a radio cell 10, in which the base station 12 is referenced BS and the radio subscribers (or their network terminations) are referenced NT. Since the radio field attenuation in a radio system 10 quadratically increases with the distance, the radio field strength at the cell edge is significantly lower than in the inside of the cell. In FIG. 1, this attenuation is illustrated with concentric circles around the base station 12. Additional attenuations, which are caused, for example, by rain, and which are likewise distance-dependent, can additionally greatly reduce the reception power available at the network terminations NT at the cell edge.

In such a radio system 10, which fundamentally represents a point-to-multipoint system (the transmitter of the base station 12 can reach the receivers of many subscribers NT), the signal transmission from the base station 12 downstream to the radio subscribers NT can proceed in time-division multiplex (TDM) in a 155 Mbit/s bit stream, and the signal transmission from the radio subscribers NT upstream to the base station 12 can proceed in a TDMA (time division multiple access) access method. in radio channels having a correspondingly higher or lower number of bits per message signal element, whereby the multiply transmitted bits are in turn respectively combined to a single bit at the reception side.

With such a power scaling (also, advantageously, simple to implement in an already existing TDM/TDMA system) in accord wherewith a multiple transmission of bits potentially occurs dependent on the distance between base station and radio subscriber and a radio channel of exactly the required number of bits per symbol is assigned therefor to the respectively already existing connections between base station and radio subscribers, the invention advantageously enables an optimum power utilization within the radio cell, whereby the overall transmission power of the base station can be correspondingly reduced or (given unaltered overall transmission power) the power that has been gained can be used for increasing the cell radius.

The bit number per message signal element (symbol), i.e. the repetition factor with which a bit is multiply transmitted in immediate succession, can be an arbitrary whole number n, so that a correspondingly fine, potentially adaptive matching to the respective radio channel attenuation is possible. The increase of the bit number per message signal element, or expressed in other words, the multiple, immediately succeeding transmission of a bit in the framework of the aggregate bit rate of the system given combination to a correspondingly "long" bit (or a single symbol) has the following effect:

Each doubling of the bit duration by 2-fold (and, further, 4-fold, 8-fold . . . ) transmission of the same bit doubles the part of the overall transmission power devolving onto the bit (or the symbol corresponding to it), i.e. the proportional signal power S becomes respectively 3 dB greater. In the time domain, this has the direct effect of 2-fold (and, further, 4-fold, 8-fold . . . ) energy per individual symbol.

Each such doubling of the bit number per symbol simultaneously halves the bandwidth of the signal; the transmission of the overall transmission power $P_s$ within half the respective bandwidth increases the power/Hz by respectively 3 dB.

By halving the bandwidth, the noise power R per symbol is simultaneously reduced by respectively 3 dB given appropriate low-pass filtering.

Overall, the signal/noise ratio S/N for n=2, 3, 4, 5, 6, . . . bits/symbol is thus improved by 9 dB or 14 dB or 18 dB or 21 dB or 23 dB, etc., i.e. the signal/noise ratio S/N is raised by 9 dB given every doubling of the bit duration.

Due to the concentration of the entire transmission power, resulting from the multiple transmission of bits, onto a correspondingly smaller frequency band, the channel capacity is optimally utilized for radio subscribers (network terminations) at a greater distance from the base station. In systems of limited power, no power or channel capacity is "given away". Since the influence of multipath effects is greatly diminished due to the lengthened bit or symbol duration, the digital signals, in an expedient development of the invention, can also be transmitted on radio links with inadequate signal/noise ratio with a correspondingly higher bit number per message signal element (symbol) to radio subscribers lying closer to the base station.

DESCRIPTION OF THE PREFERRED EMBODIMENTS

Figure 1:
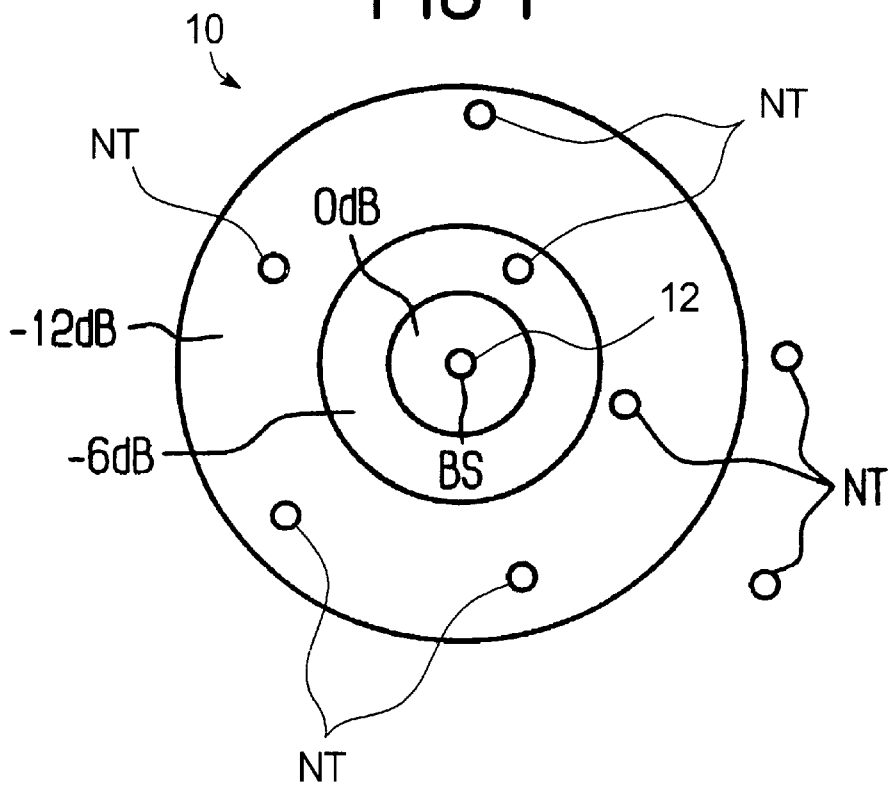
FIG. 1 is a typical image of a radio cell with attenuations occurring therein.
Figure 2:
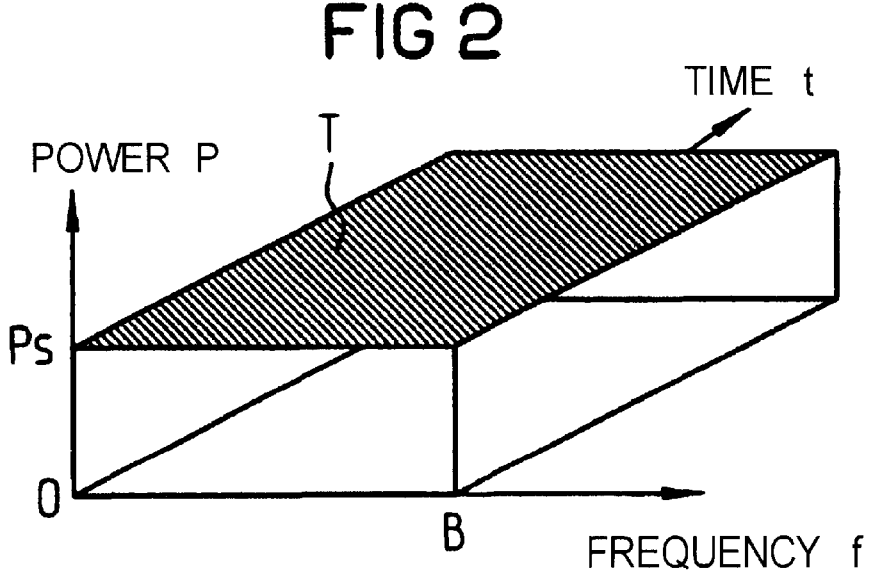
FIG. 2 shows the uniform distribution of the overall available transmission power over time and frequency.
Figure 3:
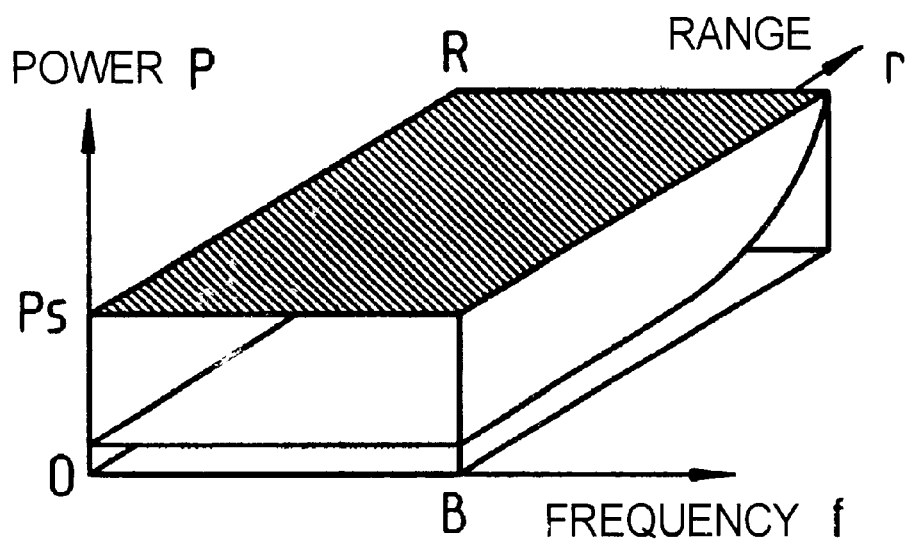
FIG. 3 shows the curve of the transmission power required for a constant bit error rate dependent on the distance of the radio subscriber from the transmitting base station.
Figure 4:
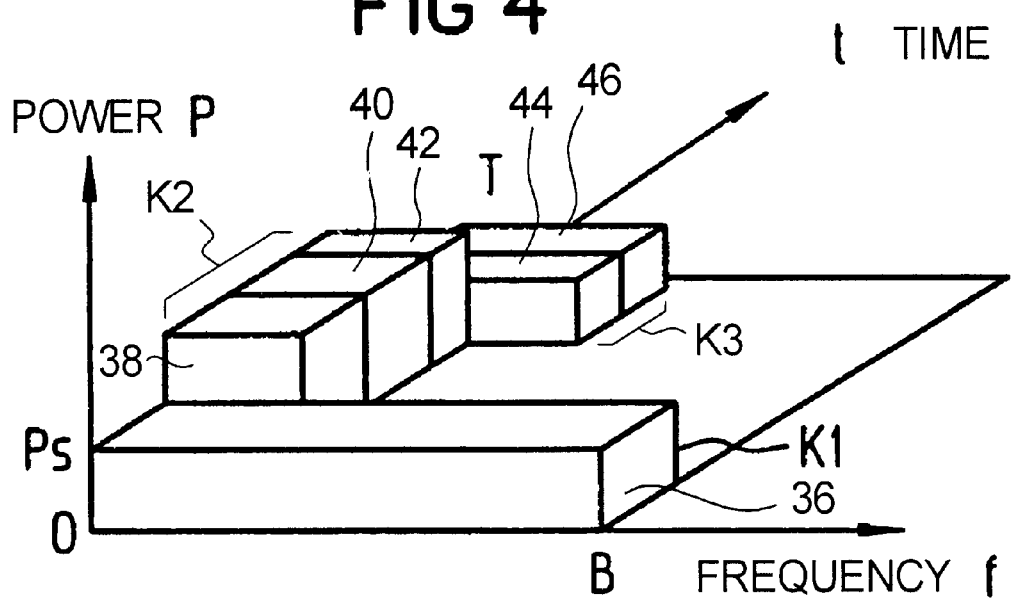
FIG. 4 shows a division of the overall transmission power over the frequency/time plane onto radio channels with a different bit number per symbol.

FIG. 4 shows an exemplary embodiment of the division of the overall transmission power of the base station 12 (FIG. 1) of a radio cell 10 (FIG. 1) onto the frequency bands of time-division multiplex radio channels 48 with a different number of bits per message signal element (symbol), whereby the illustration in FIG. 4 only covers three such time-division multiplex radio channels 48, shown as K1, K2, K3. For the digital signal transmission, proceeding in the aggregate bit clock of the system, from the base station 12 (FIG. 1) to the radio subscribers NT (FIG. 1) located in the radio cell 10 (FIG. 1), each connection from the base station 12 (FIG. 1) to a radio subscriber NT (FIG. 1) has one or even more radio channels 48 with the respectively required bit number per symbol allocated to it based on the criterion of its distance from the base station 12 (FIG. 1) or, stated generally, its respective signal/noise ratio according to the criterion: connections to radio subscribers located at a greater distance from the base station have correspondingly narrower-band radio channels 48 with a higher bit number per symbol allocated to them wherein the digital signals are transmitted with higher power/Hz, and connections to radio subscribers NT (FIG. 1) located at a smaller distance from the base station 12 (FIG. 1) have correspondingly broader-band radio channels 48 with a lower bit number per symbol allocated to them wherein the digital signals are transmitted with a lower power/Hz.

In the exemplary embodiment according to FIG. 4, thus, let the channel K1 be allocated to a connection having good transmission conditions to a radio subscriber NT (FIG. 1) at no great distance from the base station 12 (FIG. 1) to which the digital signals can be transmitted with a relatively low bit number 36 per symbol 50. The radio channel K1, accordingly, is comparatively broadband, and the digital signals are transmitted with a relatively low power/Hz.

Compared thereto, let channel K3 be allocated to a connection with good transmission conditions to a radio subscriber NT (FIG. 1) at a noticeably greater distance form the base station 12 (FIG. 1) to which the digital signals must be transmitted with a higher bit number 44 and 46 (two-fold in the example) per symbol 54. The radio channel K3, accordingly, is less broadband, and the digital signals are transmitted with correspondingly higher power/Hz.

The influence of multipath effects is also greatly reduced due to the multiplied bit duration. A multiple transmission of bits can therefore also be provided for connections to radio subscribers NT (FIG. 1) located closer to the base station 12 (FIG. 1) per se with a poor radio channel 48. Accordingly, let the channel K2 in the exemplary embodiment according to FIG. 4 be allocated to a connection with poor transmission conditions to a radio subscriber NT (FIG. 1) located more or less far from the base station 12 (FIG. 1) to which the digital signals must be transmitted with an even higher bit number 38, 40, 42 (three-fold in the example) per symbol 52 precisely because of these poor transmission conditions. The radio channel K2, accordingly, is even narrower, and the digital signals are transmitted with an even higher power/Hz.

The bits acquired at the transmission side, for example by corresponding multiple sampling of a message signal element (symbol), and multiply transmitted in the aggregate bit clock of the system are recombined at the reception side to a correspondingly long bit that then represents the underlying message signal element (symbol). Various devices can be integrated at the radio subscribers NT (FIG. 1) to recombine the multiply transmitted samples.

Without this having to be explained again in greater detail here, a respective adaptive filter (for minimizing the noise bandwidth) and a signal sampling circuit whereat the optimum sampling time for the sampling is to be adaptively determined can be respectively provided therefor at the reception side in the network terminations of the radio subscribers.

Alternatively, an integrator with variable length can also be provided in which the signal energy of the entire (multiplied) bit duration is respectively accumulated and the noise power is simultaneously, optimally suppressed.

Although modifications and changes may be suggested by those of ordinary skill in the art, it is the intention of the inventor to embody within the patent warranted hereon all changes and modifications as reasonably and properly come within the scope of his contribution to the art.

We claim as our invention:

1. A system for transmitting digital signals in a broadband RLL (radio in the local loop) subscriber line network comprising:

a radio cell having a base station and at least one radio subscriber located in the radio cell;

a transmitter means in said base station for transmitting digital signals from said base station to said radio subscriber in time-division multiplex radio channels with a differing bit number per message signal element according to an aggregate bit clock, said transmitter means including means for allocating a radio channel having a required bit number per message signal element to every transmission from said base station to said radio subscribers dependent on a distance from said base station to said radio subscriber, with digital signals to radio subscribers at a greater distance from said base station being transmitted in radio channels having a higher number of bits per message signal element, and digital signals to radio subscribers at a smaller distance from said base station being transmitted in radio channels having a lower number of bits per message signal element; and means in said radio subscriber for recombining said transmitted bits per message signal element to a single bit.

2. A system for transmitting digital signals as claimed in claim 1, wherein said radio channels include a radio channel to a radio subscriber at a smaller distance from said base station having an inadequate signal-to-noise ratio and wherein said transmitter means includes means for transmitting said digital signals on said radio channel with an inadequate signal-to-noise ratio with a correspondingly higher bit number per message signal element.

* * * * *